United States Patent [19]

Maeda et al.

[11] 3,882,243

[45] May 6, 1975

[54] AQUEOUS SUSPENSIONS OF STABLE NON-BETA TYPE CRYSTALS OF HIGHER FATTY ACID ESTERS OF CHLORAMPHENICOL

[75] Inventors: Tadao Maeda, Minoo; Tomoaki Kiyotaki, Ibaraki; Yasuo Katsuhara, Kobe; Takayoshi Mitsunaga, Takatsuki; Mitsuo Iwade, Settsu, all of Japan

[73] Assignee: Sumitomo Chemical Company Limited

[22] Filed: Aug. 18, 1972

[21] Appl. No.: 281,941

[30] Foreign Application Priority Data

Feb. 4, 1972 Japan.............................. 47-13190

[52] U.S. Cl. .............. 424/312; 260/404.5; 424/324
[51] Int. Cl............................................. A61k 21/00
[58] Field of Search .......... 424/312, 324; 260/404.5

[56] References Cited
UNITED STATES PATENTS 3,160,565  12/1964  Duill.............................. 424/295 X
3,592,933  7/1971  Kullenberg........................... 424/324
3,702,364  11/1972  Boghosian et al................... 424/324
3,708,594  1/1973  Akito et al........................... 424/324

OTHER PUBLICATIONS

Chemical Abstracts 55:14017d (1961).

Primary Examiner—Albert T. Meyers
Assistant Examiner—Leonard Schenkman
Attorney, Agent, or Firm—Wenderoth, Lind & Ponack

[57] ABSTRACT

A process for preparing an aqueous suspension of stable non-$\beta$-type crystals of a chloramphenicol high fatty acid esters by suspending non-$\beta$-type crystals of a chloramphenicol higher fatty acid ester with a sucrose fatty acid ester in water. Also provided herein is a stable pharmaceutical composition in the form of the aqueous suspension of the aforementioned components.

3 Claims, No Drawings

AQUEOUS SUSPENSIONS OF STABLE NON-BETA TYPE CRYSTALS OF HIGHER FATTY ACID ESTERS OF CHLORAMPHENICOL

The present invention relates to a method of preparing an aqueous suspension containing stable non-$\beta$-type crystals of chloramphenicol higher fatty acid ester which prevents non-$\beta$-type crystals from being transformed into lower bioactive $\beta$-type crystals.

In other words, the present invention is a method of preparing an aqueous suspension containing stable non-$\beta$-type crystals of chloramphenicol higher fatty acid ester which prevents non-$\beta$-type crystals from being transformed into $\beta$-type crystals, characterized by adding a sucrose fatty acid ester in the preparation process of said suspension.

It is well known that the polymorphic forms of chloroamphenicol higher fatty acid ester are distinguished into three types, i.e. the amorphous, $\alpha$- and $\beta$-types. Among them, the amorphous and $\alpha$-types are absorbed well upon oral administration to give high serum concentration, while the $\beta$-type is biologically inactive and exhibits practically no therapeutic effect.

Aqueous suspensions containing non-$\beta$-type crystals of chloramphenicol higher fatty acid ester have been heretofore obtained by various preparing methods. Such aqueous suspensions, however, have a disadvantage that the bioactivity is lowered because the crystals of chloramphenicol higher fatty acid ester in suspension grow gradually after standing for storage and are finally transformed from the amorphous or $\alpha$-type into $\beta$-type crystals.

We made extensive studies for a method of preparing an aqueous suspension of stable chloramphenicol higher fatty acid ester by which the crystal growth or the polymorphic change into the $\beta$-type is remarkably prevented. As a result, it has now been found that, in the preparation of an aqueous suspension containing non-$\beta$-type crystals of chloramphenicol higher fatty acid ester, the non-$\beta$-type crystals of the ester are remarkably stabilized from the crystal growth or transformation into $\beta$-type crystals by adding a sucrose fatty acid ester. The present invention is based on this finding.

The method of preparing aqueous suspension containing non-$\beta$-type crystals of chloramphenicol higher fatty acid ester (hereinafter abbreviated as CPF) in the present invention includes all the methods that give an aqueous suspension of non-$\beta$-type crystals of CPF, that is, A. the method of preparing an aqueous suspension of non-$\beta$-type crystals wherein said crystals are isolated after treatment in accordance with the following methods, and resuspended in water:

1. the method of Japanese Pat. Publication No. 5798/1960 wherein CPF is dissolved under heating in a hydrophilic solvent and the solution is quenched,
2. the method of East German Pat. No. 54,685 or Japanese Pat. Publication No. 33,199/1970 wherein CPF is dissolved in a hydrophilic solvent and then the solution is poured into water,
3. the method of Japanese Pat. Publication No. 33,199/1970 wherein CPF to which polyvinylpyrrolidone has been added is dissolved under heating in a dihydric or trihydric alcohol or polyethylene glycol and the solution is quenched, and
4. others, B. the method described in "Pharmazie" vol. 21, page 757 (1966) wherein CPF is dissolved under heating in a water-miscible hydrophilic solvent and then the solution is dispersed in water, C. the method described in Japanese Pat. Publication Nos. 33,676/1970 and 17,153/1971 wherein CPF is emulsified in water in the presence of a surfactant at a temperature at which CPF is not solidified, and then cooled, and D. others.

Accordingly, the present invention is a method of stabilizing non-$\beta$-type crystals of CPF in an aqueous suspension, prepared by any method as mentioned above, from the crystal growth and transformation into the $\beta$-type by adding a sucrose fatty acid ester in any step of the preparation process including the step after completion of preparing the suspension.

Representative of chloroamphenicol higher fatty acid esters in the present invention are chloramphenicol myristate, palmitate, stearate, etc.

The sucrose fatty acid esters used in the present invention include esters of higher fatty acids such as lauric acid, myristic acid, palmitic acid, stearic acid, oleic acid, linolic acid, etc. and esters of mixed fatty acids such as tallow, lard, lanolin, coconut oil, rice bran oil, castor oil, safflower oil, and their hardened oils. The sucrose fatty acid esters of which HLB values are not less than 7 are particularly preferred.

The procedures by which a sucrose fatty acid ester is added in the method of the present invention are not particularly limited, and the addition may be done in any step of the preparation process of the aqueous suspension including the step after completion of the preparation of the suspension.

For instance, in the above-mentioned (A) method, the isolated non-$\beta$-type crystals of CPF to which a sucrose fatty acid ester has been added may be suspended in water, or a sucrose fatty acid ester may be added to the suspension which was previously prepared by the (A) method, or crystals of CPF may be suspended in water in which a sucrose fatty acid ester has been dispersed or dissolved beforehand.

In the (B) method, a sucrose fatty acid ester may be dissolved beforehand in a hydrophilic solvent by heating together with CPF, or may be dissolved in water in which CPF is to be dispersed, or may be added to the suspension of CPF which has been prepared beforehand by the (B) method.

In the (C) method, a sucrose fatty acid ester may be added upon emulsifying the melt of CPF in water, or may be added to the suspension which was previously prepared by the (C) method.

Thus, as for the addition of sucrose fatty acid ester, any suitable procedures may be used in compliance with the method of preparing the aqueous suspension containing CPF, so far as such procedures are not against the objects of the present invention.

The effective amount of sucrose fatty acid esters is not particularly limited, though an amount of 0.1 to 20 % by weight based on the weight of CPF is preferable.

Furthermore, it is possible to easily prepare a syrup suitable for oral administration by adding a suspending agent, antiseptic, sweetener, perfumes, etc. to the aqueous suspension of stable non-$\beta$-type crystals of CPF obtained by the method of the present invention.

The fact that the polymorphic transformation of CPF crystals from non-$\beta$-type into $\beta$-type is quite effectively restrained by a sucrose fatty acid ester, in this invention is concretely illustrated by the following representative experimental examples.

EXPERIMENTAL EXAMPLE 1

In 90 ml. water, one gram of each of the sucrose fatty acid esters or general surfactants shown in Table 1 (when both are used in combination, one gram for each) was dissolved under heating, and these solutions were cooled to room temperature. Then, to these solutions, 5 g. chloramphenicol palmitate of non-$\beta$-type crystals was added and dispersed uniformly by a suitable stirrer and the suspensions were each made up to a total of 100 ml. with water.

These suspensions were kept at 70°C. for 24 hours or at 60°C. for 72 hours, and the amounts of the resulting chloramphenicol palmitate of $\beta$-type crystals were quantitatively determined by infrared absorption spectrophotometry and the percent formation of $\beta$-type crystals was calculated.

TABLE 1

Percent formation of $\beta$-type crystals of chloromaphenicol palmitate

Upon single use of a sucrose fatty acid ester

| Fatty acid composition of sucrose ester | HLB | Abbreviation of sucrose fatty acid ester | 70°C., 24 hrs. | 60°C. 72 hrs. |
|---|---|---|---|---|
| Stearate +palmitate | 7 | SE-1 | 20 % | 10 % |
| Same as above | 9 | SE-2 | 20 % | 10 % |
| Same as above | 11 | SE-3 | 10 % | 0 % |
| Same as above | 14 | SE-4 | 5 % | 0 % |
| Palmitate | 17 | SE-5 | 5 % | 0 % |
| Myristate | 17 | SE-6 | 5 % | 0 % |
| Oleate | 17 | SE-7 | 0 % | 0 % |
| Beef tallow | 17 | SE-8 | 5 % | 5 % |
| Lard | 17 | SE-9 | 0 % | 0 % |
| Lanolin | 17 | SE-10 | 40 % | 20 % |
| Coconut oil | 17 | SE-11 | 0 % | 0 % |
| Castor oil | 17 | SE-12 | 0 % | 0 % |
| Safflower oil | 17 | SE-13 | 0 % | 0 % |

Upon single use of general surfactant

| Surfactant | Composition | HLB | Abbreviation of surfactant | 70°C., 24 hrs. | 60°C., 72 hrs. |
|---|---|---|---|---|---|
| Sorbitan fatty acid ester | Laurate | 9 | SL | 100 % | 80 % |
| Polyoxyethylene sorbitan fatty acid ester | Stearate | 15 | TS | 70 % | 60 % |
| Same as above | Oleate | 15 | TO | 80 % | 50 % |
| Polyoxyethylene sorbitol fatty acid ester | Laurate | 16 | GL | 100 % | 80 % |
| Polyoxyethylene fatty acid ester | Stearate | 17 | MYS | 100 % | 100 % |
| Polyoxyethylene higher alcohol ester | Cetyl alcohol | 14 | BC | 100 % | 100 % |
| Glyceryl fatty acid ester | Stearate | 7 | MGS | 100 % | 30 % |
| Propylene glycol fatty acid ester | Stearate | 6 | PMS | 100 % | 100 % |
| Polyoxyethylene sorbitol beeswax derivative | Beeswax | 9 | GBW | 100 % | 100 % |
| Polyoxyethylene castor oil derivative | Castor oil | 14 | CO | 70 % | 100 % |
| Same as above | Hardened castor oil | 14 | HCO | 100 % | 100 % |
| Polypropylene polyoxyethylene alkyl ether | Cetyl alcohol | 16.4 | PBC | 100 % | 60 % |
| Polyoxypropylene polyoxyethylene copolymer | | 16 | X | 80 % | 55 % |

TABLE 1 — Continued

Percent formation of β-type crystals of chloromaphenicol palmitate

Upon single use of a sucrose fatty acid ester

| Fatty acid composition of sucrose ester | HLB | Abbreviation of sucrose fatty acid ester | 70°C., 24 hrs. | 60°C. 72 hrs. |
|---|---|---|---|---|
| Alkylsulfate | | Lauryl alcohol | SLS | 100 % | 100 % |
| N-Acyl sarcosinate | | Sodium N-lauroyl sarcosinate | SAR | 100 % | 70 % |

Upon combined use of a sucrose fatty acid ester with a general surfactant

| Composition | HLB | 70°C., 24 hrs. | 60°C., 72 hrs. |
|---|---|---|---|
| TO + SE-1 | 11 | 20 % | 10 % |
| TO + SE-2 | 12 | 30 % | 20 % |
| TO + SE-3 | 13 | 30 % | 10 % |
| TO + SE-4 | 14.5 | 20 % | 10 % |
| TO + SE-5 | 16 | 20 % | 10 % |

As shown in Table 1, the stabilizing effect of sucrose fatty acid esters on the transformation of chloramphenicol palmitate into β-type crystals is extremely remarkable in comparison with general nonionic or ionic surfactants, and this stabilizing effect is a very surprisingly peculiar one caused by sucrose fatty acid esters, which can not be found in surfactants other than sucrose fatty acid esters. In addition, this effect is also found remarkably when a sucrose fatty acid ester is added to an aqueous suspension of chloramphenicol palmitate in which a surfactant other than sucrose fatty acid ester as shown in Table 1 has been dissolved, for example polyoxyethylene sorbitan fatty acid ester, has been dissolved. In comparison with the case of single use of polyoxyethylene sorbitan fatty acid ester, when a sucrose fatty acid ester is used in combination therewith, the percent transformation into β-type crystals is low. Thus, it is apparent that the sucrose fatty acid ester remarkably restrains chloramphenicol palmitate from being transformed into β-type crystals.

The present invention will be explained in further detail by the examples set forth below. However, the invention is not limited to these examples.

EXAMPLE 1

Five grams of sucrose stearate-palmitate (HLB 14) was dissolved in 50 ml. of water under heating and the solution was cooled to room temperature. Then, to this solution, 25 g. of chloramphenicol palmitate of non-β-type crystals was added and dispersed uniformly by an ultrasonic homogenizer. Beside this suspension, 100 g. of sucrose, 100 ml. of D-sorbit solution, 0.5 g. of saccharin sodium, 0.5 g. of sodium carboxymethylcellulose, and suitable amounts of an antiseptic, defoaming agent and perfume were dissolved in 250 ml. of water. Upon mixing this solution with the foregoing aqueous suspension, a syrup of chloramphenicol palmitate of non-β-type crystals was obtained. This syrup was kept at 60°C. for 7 weeks or at 50°C. for 20 weeks, and then quantitatively determined for β-type crystals. The percent formation of β-type crystals was less than 5 % under both storage conditions.

EXAMPLE 2

In 50 ml. of water, 2.5 g. of polyoxyethylene sorbitan monooleate (HLB 15) and 1.25 g. of sucrose stearate-palmitate (HLB 7) were dissolved under heating. Thereafter, a syrup of chloramphenicol palmitate of non-β-type crystals was prepared as in Example 1. This syrup was kept at 60°C. for 7 weeks or at 50°C. for 20 weeks, and then quantitatively determined for β-type crystals. The percent formation thereof was less than 5 % under both storage conditions.

EXAMPLE 3

In a mixture of 20 g. of propylene glycol and 0.5 g. of polyoxyethylene sorbitan monooleate (HLB 15), 5.75 g. of chloramphenicol palmitate was dissolved at 70°-80°C. Besides this solution, 0.5 g. of sodium carboxymethylcellulose and 0.25 g. of sucrose stearate-palmitate (HLB 14) (containing about 70 % monoesters) were dissolved in 35 g. of water under heating and the solution was cooled to room temperature. To this solution, the warmed solution of chloramphenicol palmitate was added slowly under stirring to disperse the palmitate uniformly. Thereafter, the dispersion was made up to a total of 100 ml. with water to obtain an aqueous suspension of chloramphenicol palmitate.

COMPARATIVE EXAMPLE 1 (without the use of a cane sugar fatty acid ester)

5.75 g. of chloramphenicol palmitate was dissolved in a mixture of 20 g. of propylene glycol and 0.5 g. of polyoxyethylene sorbitan monooleate (HLB 15) at 70°-80°C. Besides this, 0.5 g. of sodium carboxymethylcellulose was dissolved in 35 g. of water under heating. After the solution was cooled to room temperature, the warmed solution of chloramphenicol palmitate was slowly added under stirring to disperse the palmitate uniformly. Thereafter, the dispersion was made up to a total of 100 ml. with water to obtain an aqueous suspension of chloramphenicol palmitate.

The thus obtained suspension was kept at 70°C. for 24 hours or at 60°C. for 72 hours and was quantitatively determined by infrared absorption spectrophotometry for the resulting chloramphenicol palmitate of β-type crystals and the percent formation thereof was calculated. The results of this Comparative Example 1 are shown in Table 2 in comparison with those of Example 3 which was carried out in accordance with the method of the present invention.

Table 2

Percent formation of β-type crystals of chloramphenicol palmitate

| Sample | 70°C, 24 hrs. | 60°C, 72 hrs. |
|---|---|---|
| Comparative Example 1 | 100 % | 100 % |
| Example 3 | 30 % | 20 % |

As apparent from Table 2, the stabilizing effect of a sucrose fatty acid ester on the transformation of chloramphenicol palmitate into β-type crystals is extremely remarkable. In Comparative Example 1, same as in Example 3, non-β-type crystals were suspended in water. However, since a sucrose fatty acid ester was not added then, extreme transformation of the crystals in the suspension into β-type crystals was caused after standing at 70°C. for 24 hours or 60°C. for 72 hours. In contrast thereto, in Example 3 in which a sucrose fatty acid ester was used, transformation into β-type crystals was remarkably restrained even under the same storage conditions.

EXAMPLE 4

5.75 g. of chloramphenicol palmitate was dissolved in a mixture of 20 g. of propylene glycol and 0.5 g. of polyoxyethylene sorbitan monostearate (HLB 15) at 70°-80°C. Besides this, 0.5 g. of sodium carboxymethylcellulose was dissolved in 35 g. of water under heating. After the solution was cooled to room temperature, the warmed solution of chloramphenicol palmitate was added slowly under stirring to disperse the particles of said palmitate uniformly. Thereafter, a solution of 0.25 g. of sucrose stearate-palmitate (HLB 11) (containing about 50 % monoesters) in 20 ml. of water was added thereto. The resulting dispersion, after being stirred until uniform, was made up to a total of 100 ml. with water to obtain an aqueous suspension of chloramphenicol palmitate.

EXAMPLE 5

Five grams of chloramphenicol palmitate was dissolved in 20 g. of polyethylene glycol 400 at 70°-80°C. Besides this, a mixture of 0.5 g. of poloxyethylene sorbitan monooleate (HLB 15) and 0.25 g. of sucrose stearate-palmitate (HLB 9) (containing about 30 % monoesters) was dissolved in 35 g. of water under heating. After the solution was cooled to room temperature, the warmed solution of chloramphenicol palmitate was added thereto slowly under stirring to disperse the particles of said palmitate uniformly. Then the dispersion was made up to a total of 100 ml. with water.

EXAMPLE 6

Ten grams of chloramphenicol palmitate and one gram of polyoxyethylene stearate (HLB 17) were melted together under heating. This mixture was added to 80 ml. of warm water kept at 45°C., using an ultrasonic homogenizer, thereby to crystallize out the chloramphenicol palmitate. Thereafter, a solution of one gram of sucrose stearate-palmitate (HLB 14) (containing about 70 % monoesters) in 10 ml. of water was added thereto and the dispersion was made up to a total of 100 ml. with water to prepare an aqueous suspension of chloramphenicol palmitate.

COMPARATIVE EXAMPLE 2 (without the use of a sucrose fatty acid ester)

Ten grams of chloramphenicol palmitate and one gram of polyoxyethylene stearate (HLB 17) were melted together under heating. This mixture was added to 80 ml. of warm water kept at 45°C., using an ultrasonic homogenizer, thereby to crystallize out the chloramphenicol palmitate. Thereafter, the dispersion was made up to a total of 100 ml. with water to prepare an aqueous suspension of chloramphenicol palmitate. The thus-obtained suspension was kept at 70°C. for 24 hours or at 60°C. for 72 hours, and was determined by infrared absorption spectrophotometry for the resulting β-type crystals of chloramphenicol palmitate to calculate the percent formation thereof. The results of this Comparative Example 2 are shown in Table 3 in comparison with the results of Example 6 which was carried out in accordance with the method of the present invention.

TABLE 3

Percent formation of β-type crystals of chloramphenicol palmitate

| Sample | 70°C., 24 hours | 60°C., 72 hours |
|---|---|---|
| Comparative Example 2 | 70 % | 55 % |
| Example 6 | 10 % | 5 % |

EXAMPLE 7

To a mixture of 10 g. of chloramphenicol palmitate and 2 g. of polyoxyethylene sorbitan monooleate (HLB 15), 80 ml. of water was added. The mixture was heated to about 100°C. under vigorous stirring to melt and emulsify the chloramphenicol palmitate, and was then cooled slowly. To this dispersion, a solution of 1 gram of sucrose stearatepalmitate (HLB 14) (containing about 70 % monoesters) in 10 ml. of water was added, and the dispersion was made up to a total of 100 ml. with water to obtain an aqueous suspension of chloramphenicol palmitate.

COMPARATIVE EXAMPLE 3 (without the use of a cane sugar fatty acid ester)

To a mixture of 10 g. of chloramphenicol palmitate and 2 g. of polyoxyethylene sorbitan monooleate (HLB 15), 80 ml. of water was added. The mixture was heated under stirring to about 100°C. to melt and emulsify the chloramphenicol palmitate, and was then cooled slowly. The dispersion was made up to a total of 100 ml. with water. The thus-obtained aqueous suspension was determined for the β-type crystals of chloramphenicol palmitate formed after storage at elevated temperatures as in Comparative Example 2. The results are shown in Table 4 in comparison with those of Example 7 which was carried out in accordance with the method of the present invention.

TABLE 4

Percent formation of β-type crystals of chloramphenicol palmitate

| Sample | 70°C., 24 hrs. | 60°C., 72 hrs. |
|---|---|---|
| Comparative Example 3 | 100 % | 60 % |
| Example 7 | 20 % | 10 % |

As apparent from Table 3 and Table 4, the stabilizing effect of sucrose fatty acid esters on the transformation of chloramphenicol palmitate into β-type crystals is extremely remarkable. In Comparative Examples 2 and 3, same as in Examples 6 and 7, non-β-type crystals of less than 1 μ were suspended in water. However, since a sucrose fatty acid ester was not added thereto then, extreme transformation of the crystals in the suspension into β-type crystals was caused after standing at 70°C. for 24 hours or at 60°C. for 72 hours. In contrast thereto, in Examples 6 and 7 in which a sucrose fatty acid ester was used, no substantial transformation into β-type crystals took place even under the same storage conditions.

EXAMPLE 8

25 g. of chloramphenicol stearate and 4 g. of polyoxyethylene (10) sorbitan stearate were melted into a mixture under heating. This melt was added to a solution of 2 g. of sucrose stearate-palmitate (HLB 11) (containing about 50 % monoesters) in 250 ml. warm water kept at 45°C., using an ultrasonic homogenizer, thereby to disperse the chloramphenicol stearate particles uniformly. The dispersion was then made up to a total of 500 ml. with water.

What we claim is:

1. A stabilized aqueous suspension of a non-β-type chloramphenicol myristate, palmitate or stearate crystals which comprises an aqueous suspension of said crystals and 0.1 to 20% by weight based on the weight of chloramphenicol myristate, palmitate or stearate, of either a sucrose ester of a fatty acid selected from the group consisting of stearic acid, palmitic acid, myristic acid, oleic acid and mixtures of stearic and palmitic acids, or a sucrose ester of a mixed fatty acid derived from beef tallow, lard, lanolin, coconut oil, castor oil or safflower oil; said sucrose ester having an HLB value of 7 to 17.

2. A stabilized suspension according to claim 1 where the non-β-type material is in the amorphous form.

3. A stabilized suspension according to claim 1 wherein the non-β-type material is in the α-form.

* * * * *